United States Patent
Glover et al.

(10) Patent No.: US 9,629,335 B2
(45) Date of Patent: Apr. 25, 2017

(54) METHOD AND APPARATUS FOR CONTROLLING AN ANIMAL'S TAIL POSITION

(71) Applicant: SCOTT MILKTECH LIMITED, Dunedin (NZ)

(72) Inventors: Thomas Glover, Christchurch (NZ); John Wilson, Te Awamutu (NZ); Robert Wilson, Geraldine (NZ)

(73) Assignee: Scott Milktech Limited, Dunedin (NZ)

(*) Notice: Subject to any disclaimer, the term of this patent is extended or adjusted under 35 U.S.C. 154(b) by 0 days.

(21) Appl. No.: 14/412,837

(22) PCT Filed: Jul. 4, 2013

(86) PCT No.: PCT/NZ2013/000116
§ 371 (c)(1),
(2) Date: Jan. 5, 2015

(87) PCT Pub. No.: WO2014/007662
PCT Pub. Date: Jan. 9, 2014

(65) Prior Publication Data
US 2015/0156986 A1    Jun. 11, 2015

(30) Foreign Application Priority Data

Jul. 6, 2012   (NZ) ...................................... 601136

(51) Int. Cl.
*A01K 13/00*    (2006.01)
*A01J 7/00*    (2006.01)
*A01K 1/12*    (2006.01)

(52) U.S. Cl.
CPC ............... *A01K 13/005* (2013.01); *A01J 7/00* (2013.01); *A01K 1/126* (2013.01)

(58) Field of Classification Search
CPC .......... A01K 1/126; A01K 13/005; A01J 7/00
See application file for complete search history.

(56) References Cited

U.S. PATENT DOCUMENTS

| | | | | | |
|---|---|---|---|---|---|
| 255,233 | A | * | 3/1882 | Andrus et al. ....... | A01K 13/005 119/811 |
| 711,602 | A | * | 10/1902 | Weed ................... | A01K 13/005 119/811 |

(Continued)

FOREIGN PATENT DOCUMENTS

| | | | | | |
|---|---|---|---|---|---|
| AT | CH 172981 | A | * | 11/1934 | ........... A01K 13/005 |
| CH | 154441 | A | * | 5/1932 | ........... A01K 13/005 |

(Continued)

OTHER PUBLICATIONS

International Search Report for International Application No. PCT/NZ2013/000116 mailed Oct. 13, 2013 (3 pages).

(Continued)

*Primary Examiner* — Stanton L Krycinski
(74) *Attorney, Agent, or Firm* — Merchant & Gould P.C.

(57) ABSTRACT

An apparatus is designed for holding the tail of an animal to one side while the animal is on a milking platform. The apparatus consists of a structure mounted to the rail along or around the milking platform which holds the tail such that the pathway to the udder between the animal's rear legs is unobstructed by the tail.

8 Claims, 6 Drawing Sheets

(56) References Cited

U.S. PATENT DOCUMENTS

| | | | | |
|---|---|---|---|---|
| 1,044,302 | A * | 11/1912 | Underhill | A01K 13/005 119/811 |
| 1,179,590 | A * | 4/1916 | Whitcomb | F16F 1/128 119/811 |
| 1,450,774 | A * | 4/1923 | Haering | A01K 13/005 119/811 |
| 1,458,821 | A * | 6/1923 | Haering | A01K 13/005 119/811 |
| 1,867,552 | A | 7/1932 | Fotel | |
| 1,904,635 | A * | 4/1933 | Trowbridge | A01K 13/005 119/811 |
| 1,927,119 | A * | 9/1933 | Giese | A01K 13/005 119/811 |
| 2,645,203 | A * | 7/1953 | Jaksekovich | A01K 13/005 119/811 |
| 3,035,546 | A * | 5/1962 | Peters | A01K 13/005 119/811 |
| 3,962,575 | A * | 6/1976 | Vandenberg | A01J 7/00 119/14.1 |
| 4,969,917 | A | 11/1990 | Prue | |
| 5,014,648 | A * | 5/1991 | Konitzer | A01K 15/04 119/810 |
| 5,086,612 | A | 2/1992 | Anderson | |
| 8,291,860 | B2 * | 10/2012 | Danneker | A01K 1/126 119/14.04 |
| 2009/0211527 | A1 * | 8/2009 | Binet | A01K 1/126 119/14.04 |

FOREIGN PATENT DOCUMENTS

| | | | | |
|---|---|---|---|---|
| CH | 185072 A | * | 7/1936 | A01K 13/005 |
| CH | 217410 A | * | 10/1941 | A01K 13/005 |
| CH | 249301 A | * | 6/1947 | A01K 13/005 |
| CH | 323246 A | * | 7/1957 | A01K 13/005 |
| CH | 413481 A | * | 5/1966 | A01K 13/005 |
| CH | 594347 A5 | * | 1/1978 | A01K 13/005 |
| CH | 595748 A5 | * | 2/1978 | A01K 13/005 |
| DE | 520891 C | * | 3/1931 | A01K 13/005 |
| DE | 833876 C | * | 7/1952 | A01K 13/005 |
| DE | 947120 C | * | 8/1956 | A01K 13/005 |
| DE | 1216004 B | * | 5/1966 | A01K 13/005 |
| DE | 1810997 A1 | * | 6/1970 | A01K 13/005 |
| DE | 9420782 U1 | * | 2/1995 | A01J 7/00 |
| DE | 9420782 U1 | | 3/1995 | |
| EP | 0 167 555 | | 9/1988 | |
| FR | 773218 A | * | 11/1934 | A01K 13/005 |
| SU | 1503795 | | 2/1988 | |
| WO | WO 2005/112617 | | 12/2005 | |

OTHER PUBLICATIONS

International Written Opinion for International Application No. PCT/NZ2013/000116 mailed Oct. 13, 2013 (4 pages).

Supplementary European Search Report for EP Application No. 13813429 mailed Feb. 16, 2016 (4 pages).

* cited by examiner

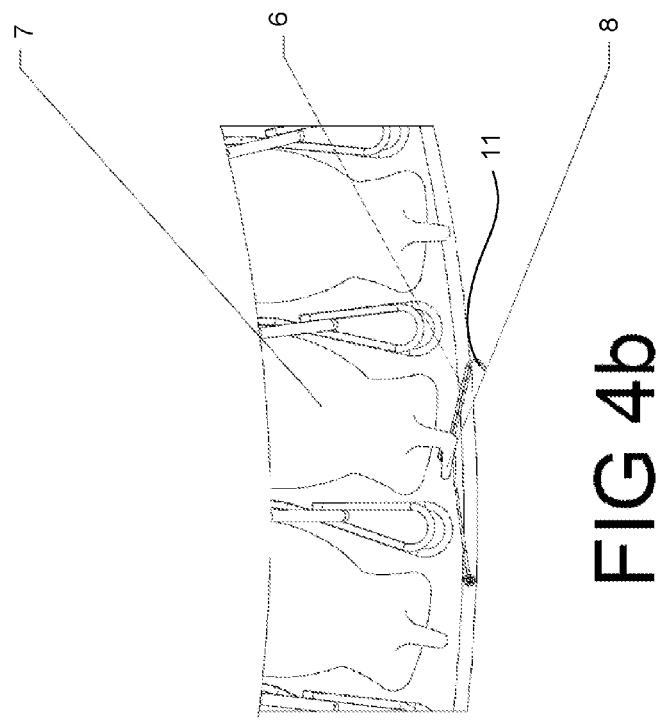
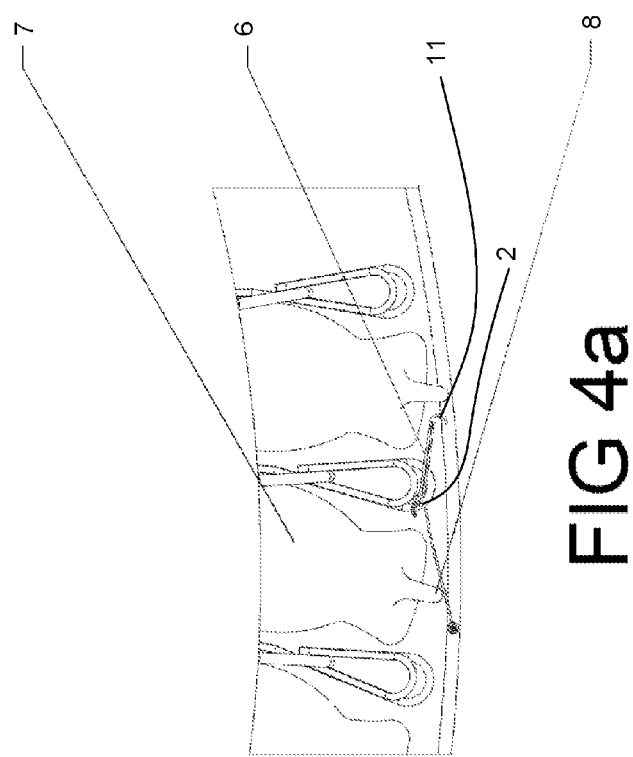

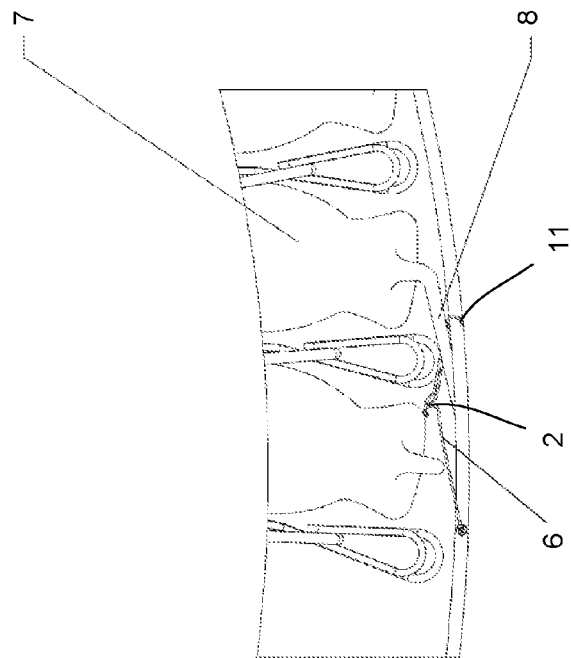
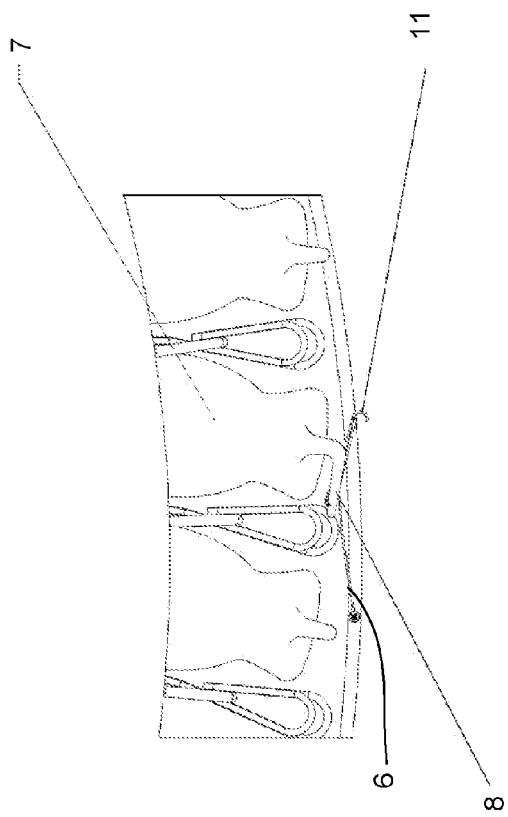

METHOD AND APPARATUS FOR CONTROLLING AN ANIMAL'S TAIL POSITION

This application is a National Stage Application of PCT/NZ2013/000116, filed 4 Jul. 2013, which claims benefit of Serial No. 601136, filed 6 Jul. 2012 in New Zealand and which applications are incorporated herein by reference. To the extent appropriate, a claim of priority is made to each of the above disclosed applications.

FIELD OF THE INVENTION

This invention relates to a method and apparatus for controlling an animal's tail position, for example to create a clear path between a cow's rear legs during dairy milking activities.

BACKGROUND OF THE INVENTION

In many dairy milking operations it is desirable for dairy animals to be standing side-by-side, e.g. to maximize space in a milking shed. Consequently many dairy milking activities involve reaching between a dairy animal's rear legs, e.g. in milk cup attachment or teat spraying.

Reaching between the dairy animal's rear legs for said dairy milking activities can have a number of disadvantages due to the presence of the animal's tail. For example:

The tail can obscure the line-of-sight of the operator or milking activity machine.

The tail can become entangled with any devices passed between the animal's legs.

The tail can transfer contaminants such as fecal matter to the operator's arms or milking activity machine.

Dairy farmers have increasingly looked to minimize the influence of the tail on dairy milking operations. One such method is to dock the tail. However, this removes the ability of the cow to swat flies etc from its back and many consider it a cruel and undesirable method.

A number of systems for holding the tail have been developed to overcome these problems. One such system is the "Kickbuster" manufactured by Kickbuster Ltd of Whakatane, New Zealand. In this system, an adjustable double ended hook is first hooked on an overhead rail then the tail is hooked on the other end and the tail hook is adjusted to lift the tail high enough that the cow cannot lift its tail out of the device. While this provides a good solution, the system requires manual attachment and removal hence takes longer to implement as well as adding to the labour cost.

Other systems, such as the "Cow tail Holder" from CattleStore.com are mounted one end overhead, and are an elasticized rope tied to the tail of the animal. This type of system overcomes the issue of tails obscuring the line of sight. However it is again a manual attach/Detach system.

It would be desirable to provide a tail positioning system which automatically removes the tail from dairy milking activities and is able to be easily retrofitted to most milking platforms or at least provide the public with a useful choice.

STATEMENTS OF INVENTION

According to one aspect there is provided a tail positioning apparatus including a hook which engages an animal's tail and moves the tail to one side by relative movement between the animal and the apparatus.

Preferably the hook of the tail positioning apparatus is attached to a lead-in bar which is held against the posterior of the animal such that during relative movement between the animal and the apparatus, the animal and the bar rub against each other guiding the hook towards the expected location of the tail.

Preferably the lead-in bar of the tail positioning apparatus is biased against the posterior of the animal by the force of a spring.

In one embodiment the hook of the tail positioning apparatus has means to release the tail when the tensile force between the tail and the hook reaches a preset limit.

Preferably the tail positioning apparatus contains the means to continue guiding the tail to the side beyond the point at which the tail is released from the hook.

In one embodiment means to continue guiding the tail is a trough.

In another embodiment the means to continue guiding the tail is one or more additional hooks.

In a preferred embodiment the animal moves past the apparatus on a moving platform.

In another embodiment the tail positioning apparatus moves.

According to a second aspect there is provided a method of moving an animal's tail to one side comprising moving an animal relative to a hook such that the hook engages and moves the animal's tail to one side.

Preferably the method of moving an animal's tail to one side utilises a lead-in bar attached to the hook whereby the lead-in bar is held against the posterior of the animal and during relative movement between the animal and the hook the animal and the bar rub against each other guiding the hook towards the expected location of the tail.

Preferably the lead-in bar is held against the posterior of the animal by spring force.

In one embodiment of the method of moving an animal's tail to one side the hook has means to release the tail when the tensile force between the tail and the hook reaches a preset limit.

Preferably the method of moving an animal's tail to one side has provision for the tail to be guided to the side beyond the point at which the tail is released from the hook.

In a preferred embodiment the method of moving an animal's tail to one side has the animal moving past the apparatus on a moving platform.

In another embodiment the method of moving an animal's tail to one side has the hook and associated apparatus moving.

According to a third aspect there is provided a dairy milking system incorporating a tail positioning apparatus as described in the above statements of invention.

According to a fourth aspect there is provided a method of performing dairy milking activities in which the animal's tail is moved to one side using a method as described in the above statements of invention.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

FIGS. 4a to 4d show a plan view of the same sequence as in FIGS. 3a to 3d.

DETAILED DESCRIPTION OF EMBODIMENTS OF THE INVENTION

The invention will be described with reference to a milking parlour using a rotary platform. However, it is to be appreciated that the tail positioning system of the invention may be applied to any desired milking configuration.

Figure 1:
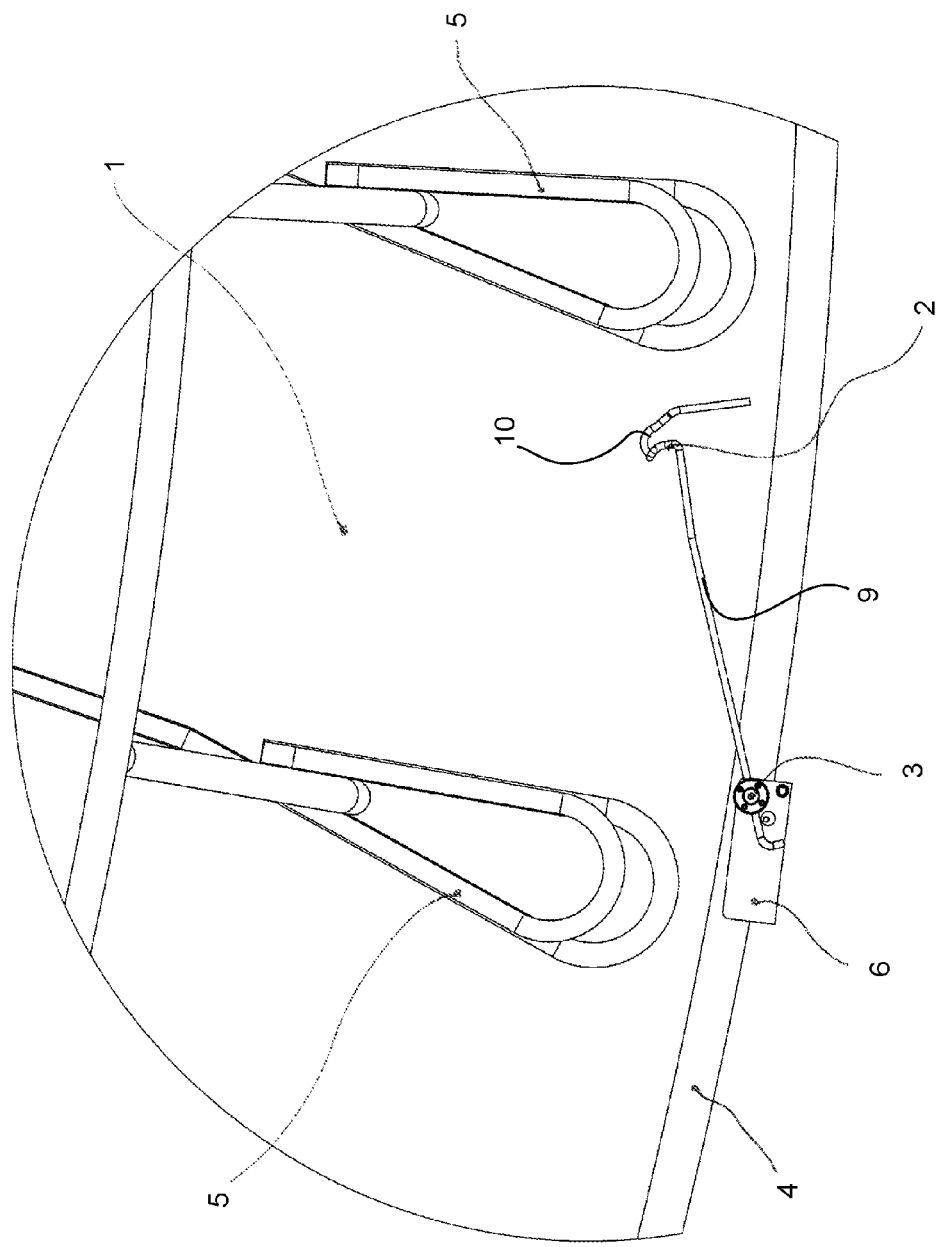
FIG. 1 shows a plan view of a milking platform having a rotating platform.
Figure 2:
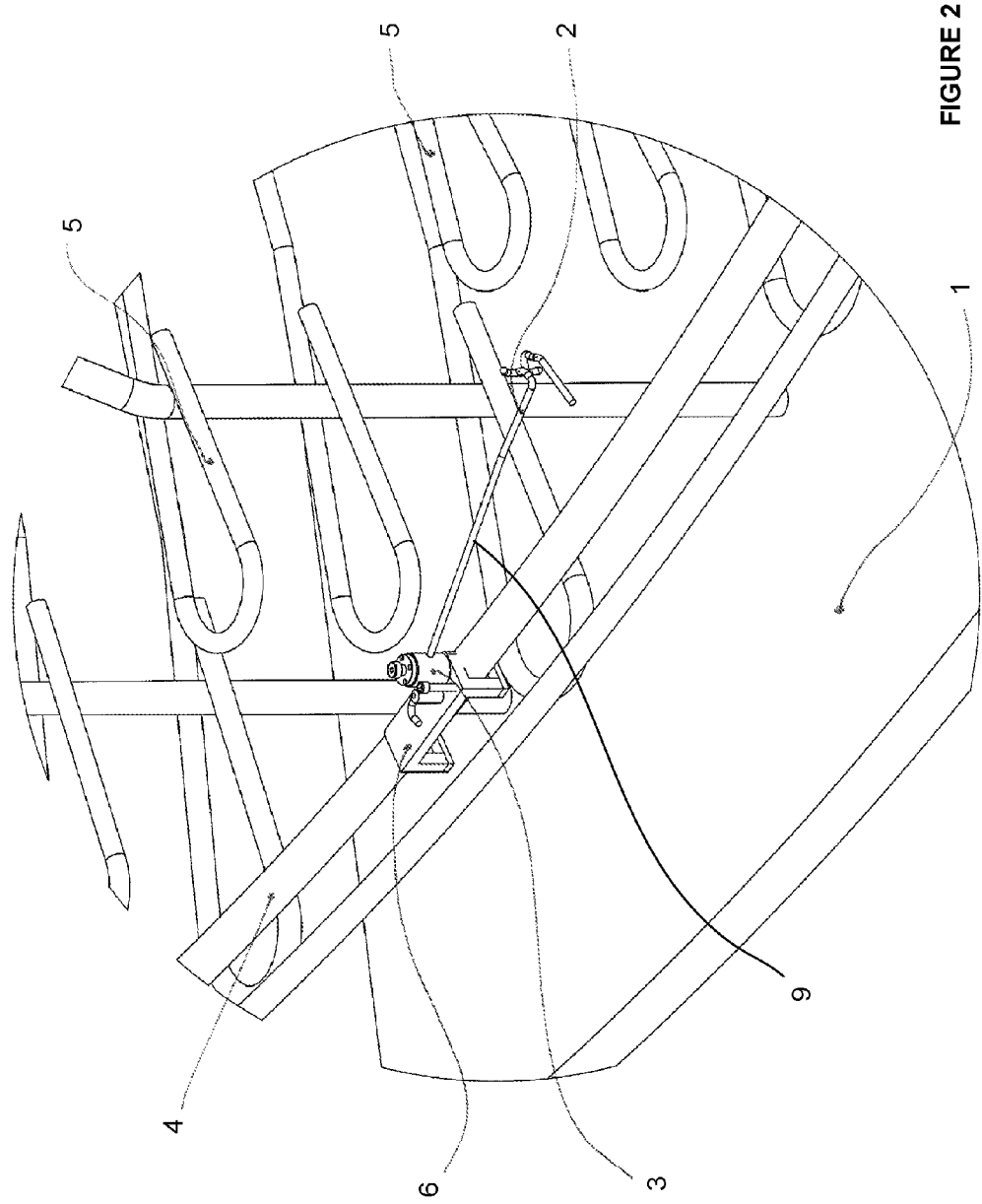
FIG. 2 shows an isometric view of the tail holding apparatus attached to the stationary rail of the rotating platform shown in FIG. 1.

Referring to FIGS. 1 & 2 a milking parlour having a rotary platform (1) is shown. As illustrated, the platform (1) will rotate anti-clockwise (left-to-right) while the outer rail (4) remains stationary. Animals enter a bale on the rotary platform (1) where the bale is defined by bale separators (5) through an opening (not shown) in the stationary rail (4) that encircles the rotating platform at a predefined entry point. As the platform is rotated, the animal is moved to locations at which various tasks such as teat spraying and milk cup attachment are performed. The tail positioning apparatus (6) is fixed to the stationary rail (4) that encircles the rotating platform at a location where it is desirable not to have the animal's tail obscuring the pathway between the animal's rear legs. Alternatively it may be desirable for a hook (2) of the tail positional apparatus (6) to have a limited amount of movement, for example to advance towards the animal's tail or to follow the animal's motion as it moves around part of the platform (1). The hook (2) of the tail positioning apparatus (6) follows the contour of the animal's posterior as the platform (1) rotates past by moving in and out around the pivot (3). The tail of the animal is captured by the hook (2) and held in the hook (2) until the platform (1) has rotated a linear distance equal to the length of the animal's tail. As the platform (1) rotates, the animal's tail slides through the hook (2). Once the platform (1) has rotated a linear distance approximately equal to the length of the animal's tail, the tail will have slid through the hook (2) completely and have been released. In the event that the tail was to become entangled in the hook (2) or was too large at some point along its length to slide through the hook (2), the hook (2) is designed with a spring release so that the animal's tail will be released and cannot be hurt. During the time the tail is held in the tail positioning apparatus (6) any operation being required on the udder can be conducted with access and vision unconstrained by the animal's tail.

Figure 3A:
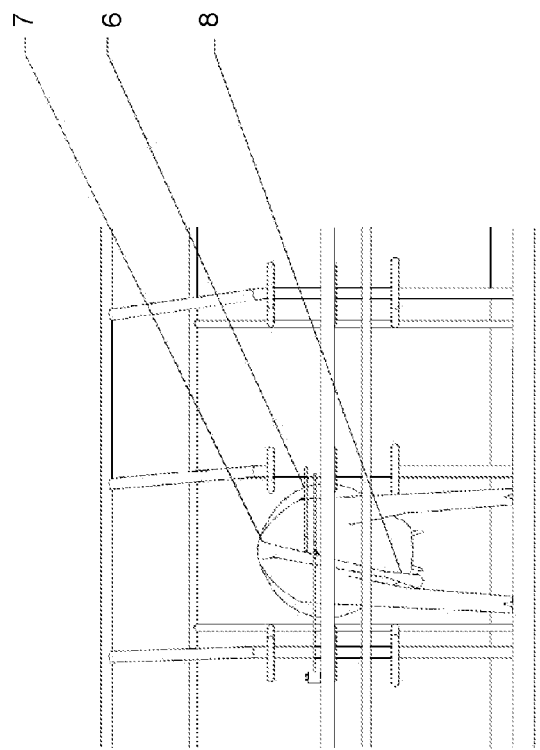
FIGS. 3a to 3d show a progressive sequence from the rear of an animal on a rotating milking platform in which the animal's tail is being manipulated by a tail holding apparatus.
Figure 3B:
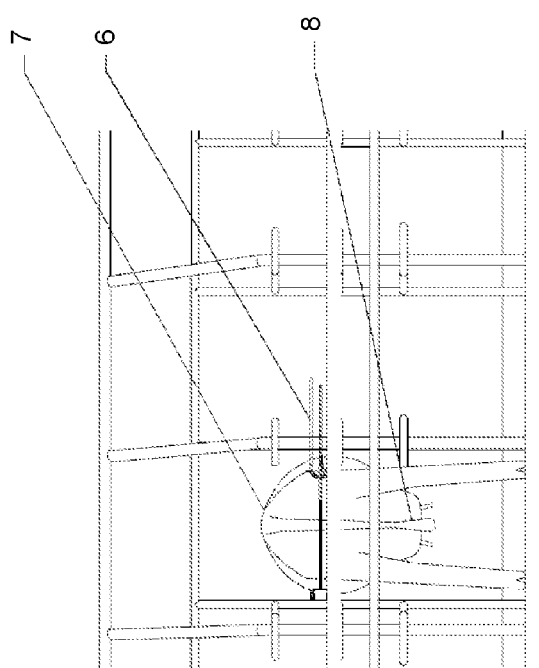
Figure 3D:
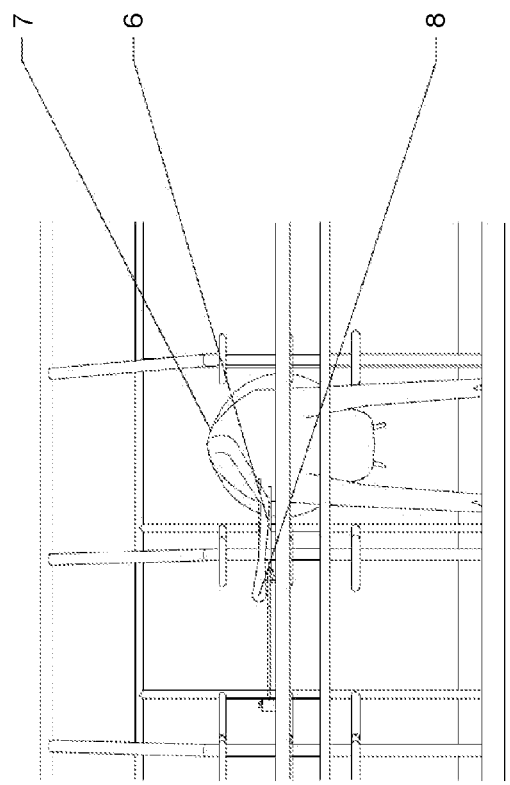
Figure 3C:
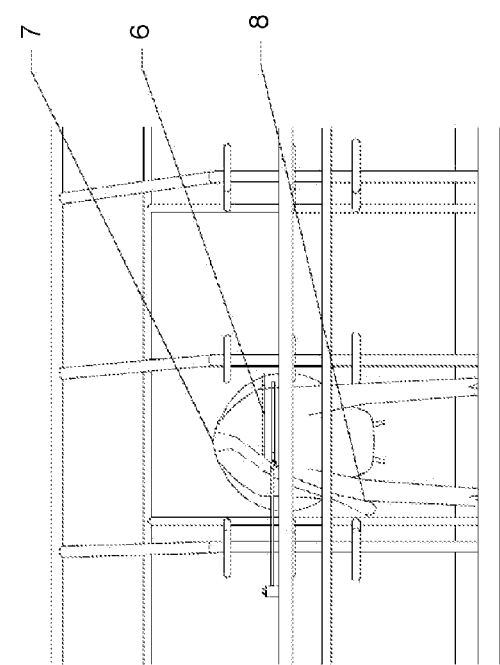

Referring now to FIGS. 3a to 3d and FIGS. 4a to 4d, an animal (7) is shown being transported on a rotary platform. The figures show a sequence in which the animal (7) is moving from left to right and the tail (8) is lifted by the hook (2). In the embodiments shown, the hook (2) is attached to a lead-in bar (9) to lengthen the distance over which the tail (8) remains lifted. The tail positioning apparatus (6) may include a trough (10) to guide the tail (8) or one or more additional hooks (11) as shown. In FIGS. 3a and 4a, the animal (7) is shown approaching the hook (2). The tail (8) will typically be pointing downwards. In FIGS. 3b and 4b, the tail (8) has begun to engage with the hook (2) and is being pushed to the side. The rear of the animal (7) has also made contact with the hook (2) and the hook (2) is forced outwards to follow the contour of the animal's rear. In FIGS. 3c and 4c, the tail (8) has been pushed sideways sufficiently to allow an unobstructed pathway between the rear legs of the animal (7) allowing various operations to be conducted between the animals rear legs without the influence of the tail (8). FIGS. 3d and 4d show the tail (8) now engaging with the additional hook (11), thus holding the tail (8) up for a further distance. Once the animal (7) has been transported far enough for the end of the tail (8) to disengage with the additional hook (11) the tail (8) will tend to drop back down to a similar posture as shown in FIG. 3a.

In an alternative embodiment (not shown) the invention may be used in a milking system such as a herringbone parlour in which the animals are stationary and the hook is actuated to engage with the tail and move it to the side.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A dairy milking system including a tail positioning apparatus and a platform for supporting an animal, the platform being configured to move with respect to the tail positioning apparatus, the tail positioning apparatus including a hook which is configured to engage the animal's tail and to move the tail to one side by relative movement between the animal on the platform and the tail positioning apparatus, whereby the hook is attached to a lead-in bar which is configured such that the hook follows the contour of the posterior of the animal such that during relative movement between the animal and the apparatus, the animal and the lead-in bar rub against each other guiding the hook towards an expected location of the tail.

2. The dairy milking system as claimed in claim 1, wherein the lead-in bar is configured to be biased against the posterior of the animal by the force of a spring.

3. The dairy milking system as claimed in claim 1, wherein the hook has a release mechanism configured to release the tail when a tensile force between the tail and the hook reaches a preset limit.

4. The dairy milking system as claimed in claim 1, further comprising a feature configured to continue guiding the tail to the side beyond a point at which the tail is released from the hook.

5. The dairy milking system as claimed in claim 4 in which the feature configured to continue guiding the tail is a trough.

6. The dairy milking system as claimed in claim 4 in which the feature configured to continue guiding the tail is one or more additional hooks.

7. The dairy milking system as claimed in claim 1 configured such that the animal moves past the apparatus on a moving platform.

8. The dairy milking system as claimed in claim 1 configured such that the hook is configured to advance towards the animal's tail or to follow the animal's motion as the animal moves around part of the platform.

* * * * *